Sept. 19, 1939.  E. F. FAY  2,173,250
ANTIFRICTION BEARING
Filed May 19, 1938
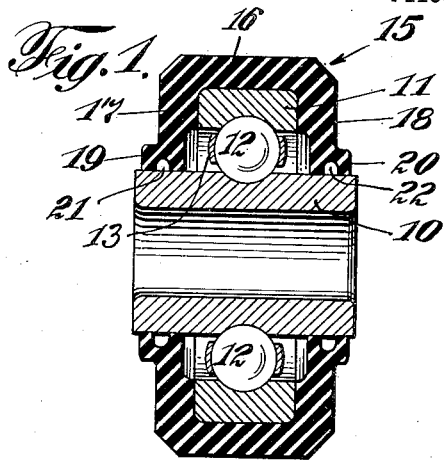
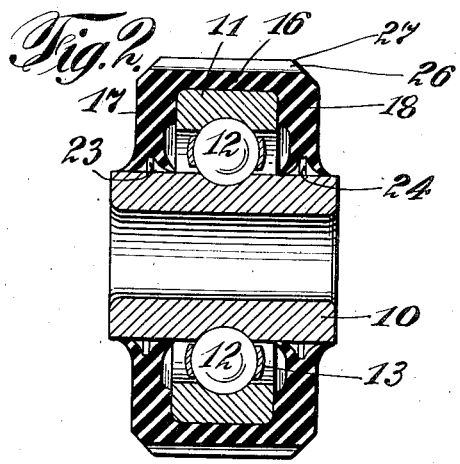
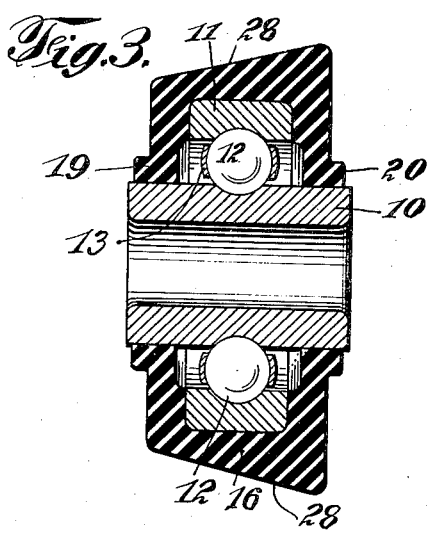
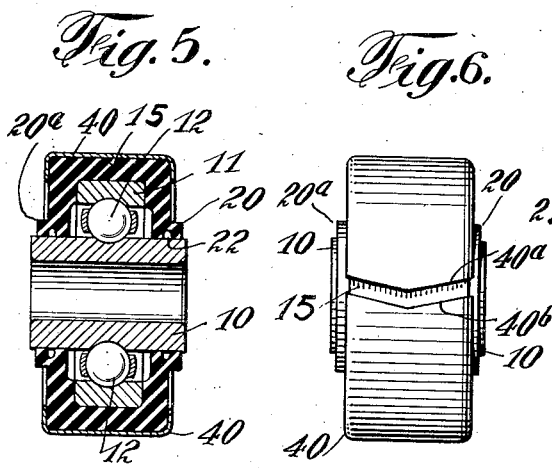
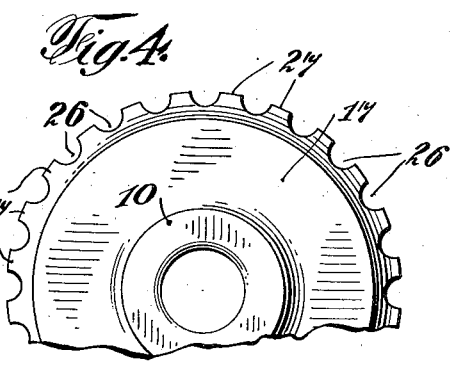
INVENTOR.
Edward F. Fay
BY C. P. Goepel
his ATTORNEY.

Patented Sept. 19, 1939

2,173,250

UNITED STATES PATENT OFFICE 2,173,250

ANTIFRICTION BEARING

Edward F. Fay, Stamford, Conn., assignor to Norma-Hoffman Bearings Corp., Stamford, Conn., a corporation of New York Application May 19, 1938, Serial No. 208,743

6 Claims. (Cl. 308—184)

This invention relates to ball bearings and more particularly to ball bearings of smaller sizes, and has for its object to provide a resilient cushion enveloping the outer ring of the bearing in the form of a molded rubber cup which is expanded over the outer race ring, the dimensions of the interior spacing of the rubber seal being less than the dimensions of the outer race ring.

The invention consists of a resilient cushion enclosing an outer race ring, said cushion having members extending over the sides of the ball bearing to the inner race ring to form a seal for the same, and, if desired, providing on said members extending lips with oil or grease grooves, where said members contact with the inner race ring.

The invention embodies other features which will be hereinafter described, the embodiments of the invention will be set forth in the drawing, and the invention itself will be finally pointed out in the claims.

In the accompanying drawing,

Figure 1 is a vertical transverse section of a ball bearing having applied thereto the improved sealing device which shows the enveloping seal with a close running clearance over the extended inner ring.

Figure 2 is a vertical transverse section of a ball bearing with another form of sealing device, in that it is provided with molded grooves so that the lips of the members will contact with the inner ring, the outer part of the sealing being provided with lateral grooves to insure a gripping action when the bearing with the sealing device is inserted into the housing.

Figure 3 is a vertical transverse section of a bearing with another embodiment of a sealing device in which the outer part thereof is of tapered construction.

Figure 4 is a side view of the embodiment shown in Figure 2.

Figure 5 is a vertical, transverse section of another form of the invention in which a thin shell extends over the elastic member, and Figure 6 is a side view of Figure 5, showing the split in the shell.

Similar characters of reference indicate corresponding parts throughout the various views.

Referring to the drawing, and more particularly to Figure 1, the inner race is shown by 10, the outer race by 11, the anti-friction members in the form of balls by 12, and the cage by 13. These parts are well known, and the particular form of ball bearing shown in the various embodiments is one in which the inner race ring extends laterally over both sides of the outer race ring.

The improvement, as shown in the embodiment of Figure 1, consists in surrounding the outer race ring and the anti-friction members and cage with a U-shaped member made of rubber or the like, preferably artificial rubber. This artificial rubber or envelope or enveloping seal 15 has a central web member 16 and legs 17 and 18 depending therefrom and extending close to and in substantial contact with the surface of the inner race ring 13. The artificial rubber has sufficient resiliency so that the molded rubber cup 15 can be expanded over the outer ring so that the bearing is completely sealed on both sides, and will have a resilient cushion in the web member 16 between the outer ring and the housing into which the bearing is inserted.

To each of the legs 17 and 18 are laterally extending parts 19 and 20 in which there are arranged grooves 21 and 22. The parts of the members 19 and 20 huggingly engage by contacting the inner race ring, but the grooves 21 and 22 are so disposed so as not to contact with the inner surface of the inner race ring. These grooves serve to hold oil or other lubricant.

The use of a rubber cushion member such as 15 eliminates close machining of the housing such as is required with rigid mountings. The use of artificial rubber causes noisy vibrations to be deadened.

In the embodiment shown in Figure 2 the grooves 23 and 24 are molded so as to have a different contour and the lateral members 19 and 20 of Figure 1 take the form of lips, so that in Figure 2, at the ends of the legs 17 and 18, there are lips, one pair of lips being provided for each leg. It has been found that this type of seal will hold a fair pressure both from within and from without the bearing. Any pressure upon these legs and in consequence upon the lips, will have a tendency to make them hug the inner ring more tightly and provide better sealing. In this embodiment of Figure 2 the periphery of the web 16 is provided with a plurality of transverse recesses 26 between adjacent ribs 27 to provide space for displacement of the rubber when the bearing with the sealing device is inserted into the housing, whereby the gripping features of the rubber envelope or cup are enhanced.

In the embodiment shown in Figure 3 the ends of the legs and the lateral members 19 and 20 contact directly with the surface of the inner race ring, and the outer perifery of the web 16 is shaped in the form of an inclined wall as indicated by 28 in Figure 3, so as to adapt this tapered construction to a similarly shaped bore of the housing and to obtain such advantages of deadening vibration as result from such a tapered envelope in the housing. The rubber material of which the cup members is made will be compressed so that it will rub on the inner race ring and the tapering form secures a tight hold in the housing when one bearing of a pair is adjusted against the other.

In the embodiments of Figures 1, 2, 3 and 5, grease is held in contact with the bearings by the depending flanges of the cups, and where grooves are provided in the flanges in contact with the inner race ring, the grease in the grooves acts as a protection against the escape of the grease from the inner part of the bearing and the entrance of dirt from the outside.

In the embodiment shown in Figure 2, the leg portions are provided with straddle members which move away from each other on pressure being applied to the leg portions against the inner race ring.

In the embodiment shown in Figure 5, the elastic rubber envelope 15 is embraced by a metal casing 40. This casing 40 is made of thin metal, and extends circumferentially around the envelope 15, in a split ring fashion, the ends 40a and 40b almost abutting each other. The casing is U-shaped, and huggingly engages the rubber envelope, having the free ends of the U-shaped member extending only a short distance along the sides of the envelope 15; this casing or very thin metal split shell 40 is preferably expanded over the artificial rubber enveloping seal 15. It permits the bearing being clamped down endwise. It also permits the envelope to be slipped into a housing without difficulty due to less friction between the metal shell 40 and the metal housing than would be the case between rubber and metal.

From the foregoing, it will be seen that in each of the embodiments there is a cup member having a web portion exterior to the outer race ring and leg portions extending inwardly therefrom towards it in contact with the inner race ring. By such an enveloping cup a sealing device is provided, and due to the inherent resiliency of the material shaped in the manner as described, this enveloping cup when placed over the outer race ring securely hugs the same and is held in position by such hugging action with the ends of the legs extending towards and in contact with the inner race ring. By a construction of this kind, a very efficient sealing device for small sized bearings is provided, thereby solving a problem which has heretofore been unsolved, due to the impossibility of grooving small race rings for adequate seals and yet maintaining their structural resistance.

While the invention has been particularly described in regards to ball bearings, it is also applicable to other forms of bearings, such as roller bearings.

Various embodiments of the invention have been shown in the drawings, and the same have been described, but I do not wish to be limited to the details thereof, as changes may be made therein without departing from the spirit of the invention as defined in the appended claims.

What I claim is:

1. In an anti-friction bearing comprising an inner race ring, an outer race ring, and anti-friction members disposed therebetween, in which the inner race ring is of greater width than the outer race ring so as to protrude beyond the same at both sides of the outer race ring, an integral artificial rubber enveloping member extending over the outer race ring, enclosing said outer race ring and the anti-friction members, and extending to contacting connection with the protruding portions of the inner race ring, said integral member having an inherent resiliency to huggingly engage the outer race ring and pressingly engage the inner race ring.

2. In an anti-friction bearing comprising an inner race ring, an outer race ring, and anti-friction members disposed therebetween, in which the inner race ring is of greater width than the outer race ring so as to protrude beyond the same at both sides of the outer race ring, an integral artificial rubber enveloping member extending over the outer race ring, enclosing said outer race ring and the anti-friction members, said enveloping member having lubricant receiving grooves disposed between the inner race ring and the enveloping member, said integral member having an inherent resiliency to huggingly engage the outer race ring and pressingly engage the inner race ring.

3. In an anti-friction bearing comprising an inner race ring, an outer race ring, and anti-friction members disposed therebetween, in which the inner race ring is of greater width than the outer race ring so as to protrude beyond the same at both sides of the outer race ring, an integral artificial rubber enveloping member extending over the outer race ring, enclosing said outer race ring and the anti-friction members, said enveloping member having a web portion and leg portions extending therefrom and lip portions at the free ends of the leg portions, with grooves disposed in said lip portions, said grooves being open against the inner race ring for holding a lubricant therein.

4. In an anti-friction bearing comprising an inner race ring, an outer race ring, and anti-friction members disclosed therebetween, in which the inner race ring is of greater width than the outer race ring so as to protrude beyond the same at both sides of the outer race ring, and integral artificial rubber enveloping member extending over the outer race ring, enclosing said outer race ring and the anti-friction members, said enveloping member having lip portions disposed upon the inner race ring and having spaced parts less in cross section than that of the outer race ring to huggingly engage the outer race ring, said lip portions extending in opposite direction and having an inherent resiliency to press upon the inner race ring.

5. In an anti-friction bearing comprising an inner race ring, an outer race ring, and anti-friction members disposed therebetween, in which the inner race ring is of greater width than the outer race ring so as to protrude beyond the same at both sides of the outer race ring, an integral artificial rubber enveloping member extending over the outer race ring, enclosing said outer race ring and the anti-friction members, said enveloping member having lubricant receiving grooves disposed between the inner race ring and the enveloping member and having spaced parts less in cross section than that of the outer race ring to huggingly engage the outer race ring, and corrugations at the exterior of the enveloping member transversely thereof.

6. In an anti-friction bearing comprising an inner race ring, an outer race ring, and anti-friction members disposed therebetween, in which the inner race ring is of greater width than the outer race ring so as to protrude beyond the same at both sides of the outer race ring, an integral artificial rubber enveloping member extending over the outer race ring, enclosing said outer race ring and the anti-friction members, said enveloping member having a web portion and leg portion extending therefrom, said integral member having an inherent resiliency to huggingly engage the outer race ring and pressingly engage the inner race ring, and a metallic member huggingly engaging the exterior of the enveloping member, free of the sides of the legs of the web.

EDWARD F. FAY.